United States Patent
Hebard et al.

(10) Patent No.: US 9,483,797 B1
(45) Date of Patent: Nov. 1, 2016

(54) METHOD AND SYSTEM FOR RECORDING A TRANSACTION USING A DYNAMIC USER INTERFACE WITHIN AN APPLICATION

(71) Applicants: Emily Hebard, San Carlos, CA (US); Bridgette Haymaker, Mountain View, CA (US); Dorelle Rabinowitz, Santa Clara, CA (US); Erika Kindlund, Mountain View, CA (US); Jennifer A. Martin, Los Altos, CA (US); Joseph Davidchik, Alameda, CA (US); Joseph Wells, Mountain View, CA (US); Priyajeet Hora, Mountain View, CA (US)

(72) Inventors: Emily Hebard, San Carlos, CA (US); Bridgette Haymaker, Mountain View, CA (US); Dorelle Rabinowitz, Santa Clara, CA (US); Erika Kindlund, Mountain View, CA (US); Jennifer A. Martin, Los Altos, CA (US); Joseph Davidchik, Alameda, CA (US); Joseph Wells, Mountain View, CA (US); Priyajeet Hora, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 3 days.

(21) Appl. No.: 14/257,820

(22) Filed: Apr. 21, 2014

(51) Int. Cl.
*G07B 17/00* (2006.01)
*G07F 19/00* (2006.01)
*G06Q 40/00* (2012.01)

(52) U.S. Cl.
CPC .................. *G06Q 40/12* (2013.12)

(58) Field of Classification Search
None
See application file for complete search history.

(56) References Cited

U.S. PATENT DOCUMENTS

| | | | |
|---|---|---|---|
| 6,249,291 B1* | 6/2001 | Popp et al. | 345/473 |
| 7,216,292 B1* | 5/2007 | Snapper et al. | 715/236 |
| 7,343,559 B1* | 3/2008 | Fujita et al. | 715/733 |
| 2012/0123924 A1* | 5/2012 | Rose et al. | 705/35 |
| 2012/0310826 A1* | 12/2012 | Chatterjee | 705/41 |
| 2014/0019352 A1* | 1/2014 | Shrivastava | 705/41 |
| 2014/0337071 A1* | 11/2014 | Stiffler et al. | 705/7.13 |
| 2015/0012420 A1* | 1/2015 | Kim et al. | 705/40 |
| 2015/0019661 A1* | 1/2015 | Johnson et al. | 709/206 |

* cited by examiner

*Primary Examiner* — Fateh M Obaid
(74) *Attorney, Agent, or Firm* — Osha Liang LLP

(57) ABSTRACT

A method for recording a transaction using a Dynamic User Interface (DUI) within an application, including receiving, from a user of the application, the transaction relating to a customer of the user; receiving a request to generate a form for the transaction; generating, based on the request to generate the form, the form containing a customer list and a form element; receiving a request to generate the DUI; generating, based on the request to generate the DUI, the DUI adjacent to the form displayed within the application; receiving an identification of the customer from the customer list; populating, based on the identification of the customer, the DUI with the transaction relating to the customer; receiving, from the user, a selection of the transaction from the DUI; populating, within the form adjacent to the DUI, the form element using the transaction; and recording, within the application, the transaction.

25 Claims, 6 Drawing Sheets

METHOD AND SYSTEM FOR RECORDING A TRANSACTION USING A DYNAMIC USER INTERFACE WITHIN AN APPLICATION

BACKGROUND

When a business owner (i.e. user) fills out a form relating to a transaction in a website or application, the user may often be required to obtain disparate pieces of information from various sources (e.g. customer data, bank data, expense data), and then input these pieces of information into the form. This can be a time consuming and manually intensive process, involving many steps and a lot of navigating between applications of different parts of one application. Often times, even if the data exists in the application, there is no way for the user to intelligently add the data to a form based on the context of the form.

SUMMARY

In general, in one aspect, the invention relates to a method for recording a transaction using a Dynamic User Interface (DUI) within an application. The method includes receiving, from a user of the application, the transaction relating to a customer of the user; receiving, from the user and within the application, a request to generate a form for the transaction; generating, based on the request to generate the form and within the application, the form containing a customer list and a form element; receiving, from the user and within the application, a request to generate the DUI; generating, based on the request to generate the DUI, the DUI adjacent to the form displayed within the application; receiving, from the user and within the form adjacent to the DUI, an identification of the customer from the customer list; populating, based on the identification of the customer, the DUI with the transaction relating to the customer, where the transaction is owned by an application operator; receiving, from the user, a selection of the transaction from the DUI; populating, within the form adjacent to the DUI, the form element using the transaction; and recording, within the application, the transaction.

In general, in one aspect, the invention relates to a system for recording a transaction using a Dynamic User Interface (DUI). The system includes a first service provider server containing: a computer processor, and an application executing on the computer processor, with functionality to perform: receiving, from a user of the application, the transaction, from outside the service provider server, relating to a customer of the user, receiving, from the user and within the application, a request to generate a form for the transaction; generating, based on the request to generate the form and within the application, the form containing a customer list and a form element; receiving, from the user and within the application, a request to generate the DUI; generating, based on the request to generate the DUI, the DUI adjacent to the form displayed within the application; receiving, from the user and within the form adjacent to the DUI, an identification of the customer from the customer list; populating, based on the identification of the customer, the DUI with the transaction relating to the customer, where the transaction is owned by an application operator; receiving, from the user, a selection of the transaction from the DUI; populating, within the form adjacent to the DUI, the form element using the transaction; and recording, within the application, the transaction. The system also includes a second service provider server communicatively coupled to the first service provider server and containing a data repository storing the transaction.

In general, in one aspect, the invention relates to a non-transitory computer readable storage medium storing instructions for recording a transaction using a Dynamic User Interface (DUI) within an application, the instructions executable on a computer processor and containing functionality for: receiving, from a user of the application, the transaction relating to a customer of the user; receiving, from the user and within the application, a request to generate a form for the transaction; generating, based on the request to generate the form and within the application, the form containing a customer list and a form element; receiving, from the user and within the application, a request to generate the DUI; generating, based on the request to generate the DUI, the DUI adjacent to the form displayed within the application; receiving, from the user and within the form adjacent to the DUI, an identification of the customer from the customer list; populating, based on the identification of the customer, the DUI with the transaction relating to the customer, where the transaction is owned by an application operator; receiving, from the user, a selection of the transaction from the DUI; populating, within the form adjacent to the DUI, the form element using the transaction; and recording, within the application, the transaction.

Other aspects of the invention will be apparent from the following description and the appended claims.

DETAILED DESCRIPTION

Figure 1:
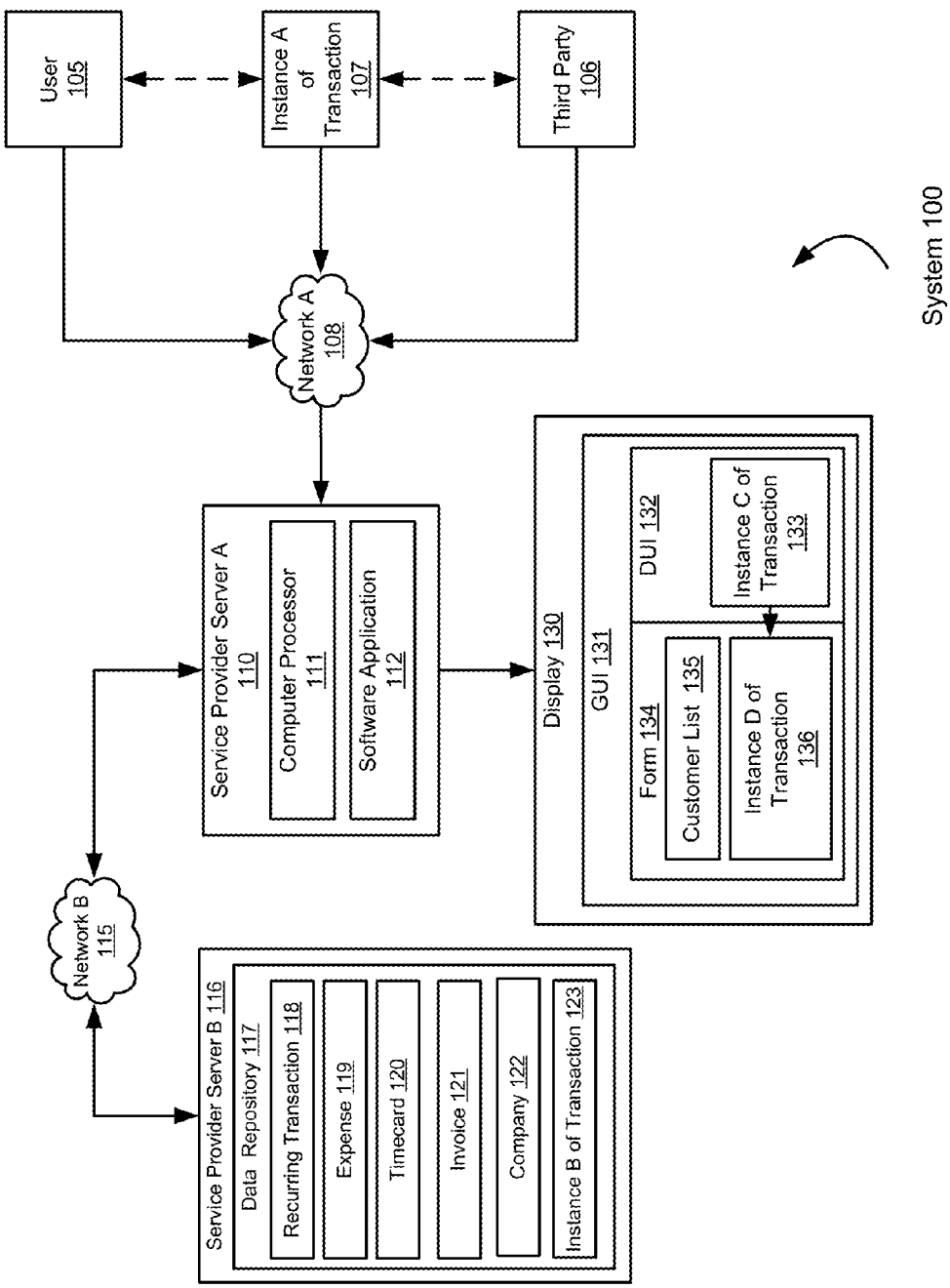
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for recording a transaction using a Dynamic User Interface (DUI) within an application. Specifically, a DUI is displayed next to a form in a graphical interface (GUI). The DUI contains data relating to the form, and is context sensitive. In other words, the data in the DUI relates to the context of the form. For example, if the form relates to an invoice of a specific customer, the data in the DUI may relate to the invoice of the customer. In most embodiments of the invention, the DUI does not cover or block the form, but appears next to it, so that a user may see all relevant information in one view. The form and DUI may appear in a graphic interface in a desktop computing device, or a mobile device.

FIG. 1 shows a system (100) in accordance with one or more embodiments of the invention. As shown in FIG. 1, the system (100) includes components such as a service provider server A (110), a software application (112), a service provider server B (116), a data repository (117), a display (130), and a GUI (131). These components are described below and may be located on the same device (e.g. a server, mainframe, desktop Personal Computer (PC), laptop, Personal Digital Assistant (PDA), telephone, mobile phone, kiosk, cable box, glasses device, and any other device) or may be located on separate devices connected by a network (e.g. the Internet, a wide area network (WAN), or a local area network (LAN)), with wired and/or wireless segments. In one or more embodiments of the invention, there may be more than one software application (112) and GUI (131) running on a device, as well as more than one service provider server A (110), service provider server B (116), and display (130) interfacing with those components.

In one or more embodiments of the invention, a user (105) may be an owner of a business, and uses software application (112) to manage business concerns. A third party (106) may be a company, a client, a partner, or any other person or entity related to the user (105). An instance A of transaction (107) is any business record (e.g. contract) that may be managed by the user (105) and/or the third party (105). In other words, the instance A of transaction (107) may be any transaction relating to the finances and/or business of the user (105). For example, instance A of transaction (107) may be an estimate for work done by the business of the user (105) for a customer. The instance A of transaction (107) may be owned by the user (105), the third party (106), and/or a service provider (e.g. the owner, developer, and/or manager of the software application (112)).

In one or more embodiments of the invention, a service provider server A (110) may run on a computer processor (111), and is configured to host a software application (112). The software application (112) is configured to perform specific functions to record a transaction using the DUI (132).

The software application (112) may receive input from various sources, including the user (105) and the third party (106). The software application (112) may store data in and/or access data from a data repository (117). The service provider server B (116), the software application (112), and other data stored on the service provider server B (116) may be owned and/or operated by a service provider (e.g. the owner, developer, and/or manager of the software application (112)).

In one or more embodiments of the invention, the software application (112) is configured to receive the transaction relating to a customer of the user. The transaction is related to a business concern of the user. For example, a transaction may be an invoice, a bill, or any other document relating to the business of the user and the customer. In one or more embodiments of the invention, the software application (112) is further configured to receive a request to generate a form for the transaction. The form is a page that contains input elements that can be modified or written into (e.g. billing address of a customer). For example, a piece of data (i.e. a transaction) may be dragged from the DUI (132) and dropped into an input element of the form.

In one or more embodiments of the invention, the software application (112) is further configured to generate the form containing a customer list and a form element. The customer list is a list of customers from which a user can select a particular customer. The form element is an input element into which data can be copied (e.g. dragged and dropped). In one or more embodiments of the invention, the software application (112) is further configured to receive a request to generate the DUI. The DUI is a portion of the GUI that sits to the right of the form and contains various information that may relate to the selected customer. In one or more embodiments of the invention, the software application (112) is further configured to generate the DUI adjacent to the form displayed within the application.

In one or more embodiments of the invention, the software application (112) is further configured to receive an identification of the customer from the customer list. The identification and selection of a customer may be, for example, from a drop down list of all the customers of the user. In one or more embodiments of the invention, the software application (112) is further configured to populate the DUI with the transaction relating to the customer, where the transaction is owned by an application operator. For example, transactions may include anything relating to the customer such as bills, expenses, payments, and so forth.

In one or more embodiments of the invention, the software application (112) is further configured to receive a selection of the transaction from the DUI. The selection may be, for example, a drag and drop motion of the transaction visual from the DUI to the form by the user. In one or more embodiments of the invention, the software application (112) is further configured to populate, within the form adjacent to the DUI, the form element using the transaction. In one or more embodiments of the invention, the software application (112) is further configured to record the transaction. Those skilled in the art will appreciate that the software application (112) may perform other functions beyond those disclosed.

In one or more embodiments of the invention, the service provider server B (116) is configured to host a data repository (117). The data repository (117) may contain data associated with the software application (112). The data repository (117) may be a relational database that stores data entries associated with the software application (112). The data repository (117) may also be a spreadsheet containing data cells associated with the software application (112). In one or more embodiments of the invention, the data repository (117) may be implemented with many technologies. The data repository (117) may receive data from various sources, including the software application (112) over a network B (115).

After receiving data from the software application (112), the data repository (117) may process (i.e. modify, transform, format) the data, and then store the data. The data may include a recurring transaction (118), an expense (119), a timecard (120), an invoice (121), a company (122), and an instance B of the transaction (123). The recurring transaction (118) may be a transaction that occurs on a specified time interval, such as a monthly bill to a customer. The expense (119) may be an expense of the user and/or a customer of the user. The timecard (120) may be a record of the time worked by an employee of the user's business. The invoice (121) may be an invoice for the customer of the user (i.e. of the business of the user). The company (122) may be a business that is related to the user's business in some manner. The instance B of the transaction (123) may be the instance A of the transaction (107) at a later time, after it has been processed by the software application (112) and stored in the data repository (117).

Those skilled in the art will appreciate that the data repository (117) may receive and store data from other entities beyond the software application (112), and may perform other functions beyond those disclosed. Further, the service provider server B (116), and the data stored on this server may be owned and/or operated by a service provider (e.g. the owner, developer, and/or manager of the software application (112)).

In one or more embodiments of the invention, a display (130) may display a graphic user interface (i.e. the GUI (131)). The GUI (131) may display information associated with the software application (112). The GUI (131) may be viewed in a web browser, an application window, and the like. The GUI (131) may be viewed in these display technologies by a user of the software application (112). The GUI (131) may include standard web elements, including video, audio, and text, as well as interface technologies not limited to text submission on forms, voice capture, and user gesture interpretation. In one or more embodiments of the invention there may be various other display technologies used by and to view the GUI (131).

The software application (112) may generate the GUI (131), and the elements inside the GUI (131), such as a DUI (132), an instance C of the transaction (133), a form (134), a customer list (135), and an instance D of the transaction (136). The DUI (132) is a portion of the GUI (131) that is displayed to the right of the form (134). It contains various pieces of information relating to the customer, the user, and the business concerns of the user. The data contained in the DUI (132) may be selected by the user, and dragged and dropped into the form (134). The instance C of the transaction (133) is an example of a data that may be selected from the DUI (132) and dragged and dropped into the form (134). For example, the instance C of the transaction (133) may be the same information as instance A of the transaction (107) and instance B of the transaction (123), but presented at a later time in the GUI (131). In a similar fashion, instance D of the transaction (136) may be the same data as instance C of the transaction (133), except that it has been copied (e.g. dragged and dropped by a user) into the form (134). The customer list (135) may be a list of customers that is selectable by the user (105) to identify a specific customer, and potentially to identify specific transactions related to that customer in the DUI (132). Those skilled in the art will appreciate that there may be various other elements of FIG. 1 that have not been described.

Figure 2A:
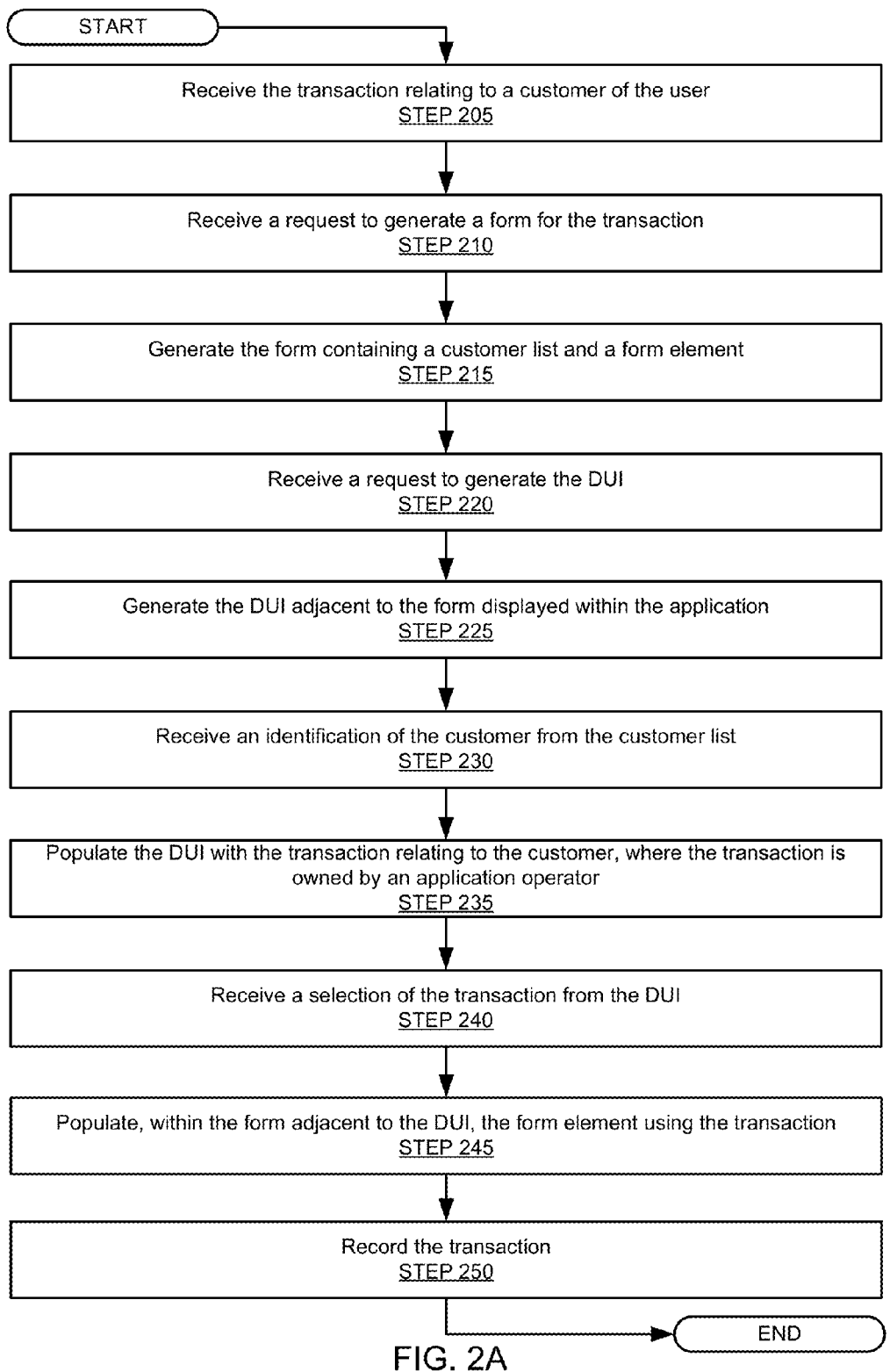
FIGS. 2A and 2B show flowcharts in accordance with one or more embodiments of the invention.

FIG. 2A shows a flowchart in accordance with one or more embodiments of the invention. The process shown in FIG. 2A may be used, for example, with the system (100), to record a transaction using a Dynamic User Interface (DUI) within an application. The sequence of steps shown in FIG. 2A may differ among embodiments of the invention, and one or more of the steps may be performed in parallel and/or may be optional. Accordingly, the scope of the invention should not be considered limited to the specific arrangement of steps shown in FIG. 2A.

In STEP 205, the transaction relating to a customer of the user is received. It may be received from a user of the application. The transaction may be, for example, a bill to a customer owed to the user for products sold to the customer.

In STEP 210, a request to generate a form for the transaction is received. It may be received from the user and within the application. The request may be, for example, initiated by the user via a mouse click in the application.

In STEP 215, the form is generated containing a customer list and a form element. It may be generated based on the request to generate the form and within the application. The customer list may contain a complete list of the customers of the user's business. The form element may be, for example, a shipping address of a customer.

In STEP 220, a request to generate the DUI is received. It may be received from the user and within the application. The request may be, for example, initiated by the user via a selection of an icon in the application.

In STEP 225, the DUI is generated adjacent to the form and displayed within the application. It may be generated based on the request to generate the DUI. The DUI may contain various transaction visuals, each representing a transaction.

In STEP 230, an identification of the customer is received from the customer list. It may be received from the user and within the form adjacent to the DUI. For example, the user may select an individual customer from the customer list in the form.

In STEP 235, the DUI is populated with the transaction relating to the customer. The transaction may be owned by an application operator, and the form may be populated based on the identification of the customer. The DUI may be populated with a number of transactions, each relating to the customer.

In STEP 240, a selection of the transaction is received from the DUI. It may be received from the user. For example, the user may select one out of a number of transactions by dragging it and dropping it into the form.

In STEP 245, the form element is populated using the transaction. It may be populated within the form adjacent to the DUI. The form element may be automatically populated with or without a selection of the form element by the user.

In STEP 250, the transaction is recorded. It may be recorded within the application. The transaction may also be recorded within a data repository operatively connected to the application.

Figure 2B:
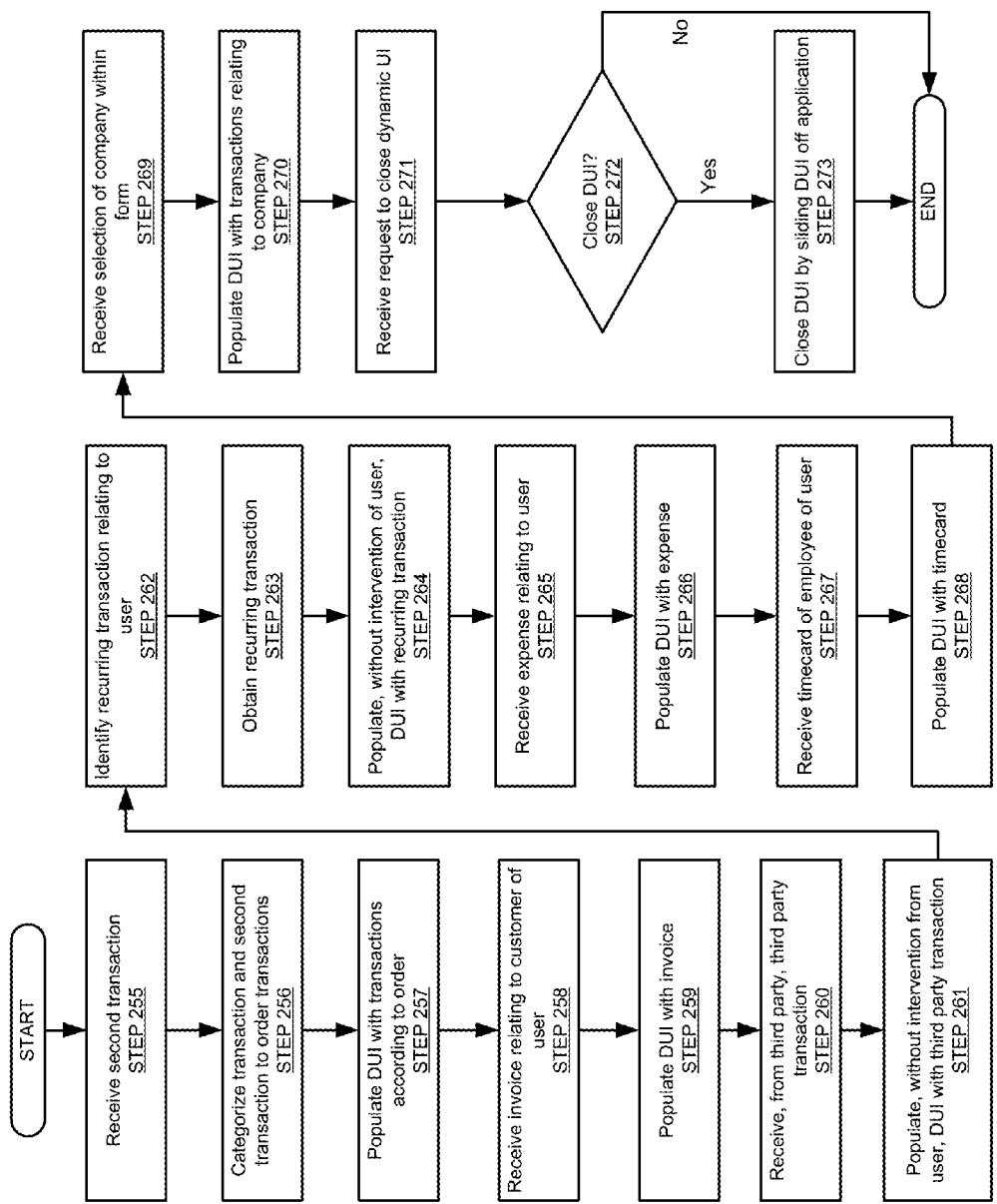

FIG. 2B shows a flowchart in accordance with one or more embodiments of the invention. The process shown in FIG. 2B may be used, for example, with the system (100), to record a transaction using a DUI within an application. The sequence of steps shown in FIG. 2B may differ among embodiments of the invention, and one or more of the steps may be performed in parallel and/or may be optional. Accordingly, the scope of the invention should not be considered limited to the specific arrangement of steps shown in FIG. 2B.

In STEP 255, a second transaction is received. It may be received from the user. The second transaction may be, for example, a promotion used by a customer.

In STEP 256, the transaction and the second transaction are categorized to order the transaction and the second transaction. The transactions may be ordered, for example, alphanumerically according to their titles. For example, if the first transaction is called "expenses", and the second transaction is called "promotions", then the ordering would be "expenses" followed by "promotions".

In STEP 257, the DUI is populated with the transaction and the second transaction according to the order. Specifically, the transactions may be displayed in the DUI according to their ordering. For example, if the order is "expenses" followed by "promotions", then the "expenses" transaction may be displayed above the "promotions" transaction in the DUI.

In STEP 258, an invoice is received relating to a customer of the user. It may be received from the user and within the application. The invoice may relate to products and/or services purchased by the customer from the user.

In STEP 259, the DUI is populated with the invoice. It may be populated within the application. For example, the details of the invoice may be input into the DUI.

In STEP 260, a third party transaction is received. It may be received from a third party and within the application. The third party transaction may be any transaction relating to the user and/or customer.

In STEP 261, the DUI is populated with the third party transaction. It may be populated automatically and without intervention from the user. For example, the details of the third party transaction may be input into the DUI.

In STEP 262, a recurring transaction relating to the user is identified. It may be identified within the application. The recurring transaction may be any transaction that occurs repeatedly within a time interval. For example, it may be a bill to a customer that occurs once a month.

In STEP 263, the recurring transaction is obtained. It may be obtained by the application, from the customer, the user, or a third party.

In STEP 264, the DUI is populated with the recurring transaction. It may be populated automatically and without intervention of the user. For example, the details of the recurring transaction may be input into the DUI.

In STEP 265, an expense relating to the user is received. It may be received from the user and within the application. The expense may relate, for example, to a product purchased by the user on behalf of the customer.

In STEP 266, the DUI is populated with the expense. It may be populated within the application. For example, the details of the expense may be input into the DUI.

In STEP 267, a timecard of an employee of the user is received. It may be received from the user and within the application. The timecard may indicate a number of hours worked by an employee of the user's business.

In STEP 268, the DUI is populated with the timecard. It may be populated within the application. For example, the details of the timecard may be input into the DUI.

In STEP 269, a selection of a company is received within the form. It may be received from the user. The company may be a client and/or partner of the user's business.

In STEP 270, the DUI is populated with transactions relating to the company. It may be populated based on the selection. For example, the details of the transactions relating to the company may be input into the DUI.

In STEP 271, a request is received to close the DUI. The request may be received from the user and within the application.

In STEP 272, it is determined if the user wants to close the DUI. If the user in fact does want to close the DUI, the process proceeds to STEP 273, otherwise the process ends.

In STEP 273, the DUI is closed by sliding the DUI off the application. The DUI may be closed based on the request.

Those skilled in the art will appreciate that the form may be related to a transaction of a customer, a company, an employee, the user's business, or various other entities associated with the business concerns of the user. Further, the DUI may other types of content beyond the transaction described, such as information about clients and vendors, tax documents, sales orders, contracts, bills, invoices, images, credit memos, purchase orders, estimates, credits, timesheets, billable time, billable expenses, billable charges, and attachments. The transactions and other data in the DUI enhance the ease of use and maintain a high relevance with the contents and focus of the form. Essentially, the DUI may populate with transactions that are related to the specific action taken by the user, and the specific form selected by the user. Each transaction may have a visual representation in the DUI. Once a transaction is copied to the form from the DUI, the visual representation of it may disappear from the DUI, although it may then again be populated in the DUI at a later time.

Figure 3:
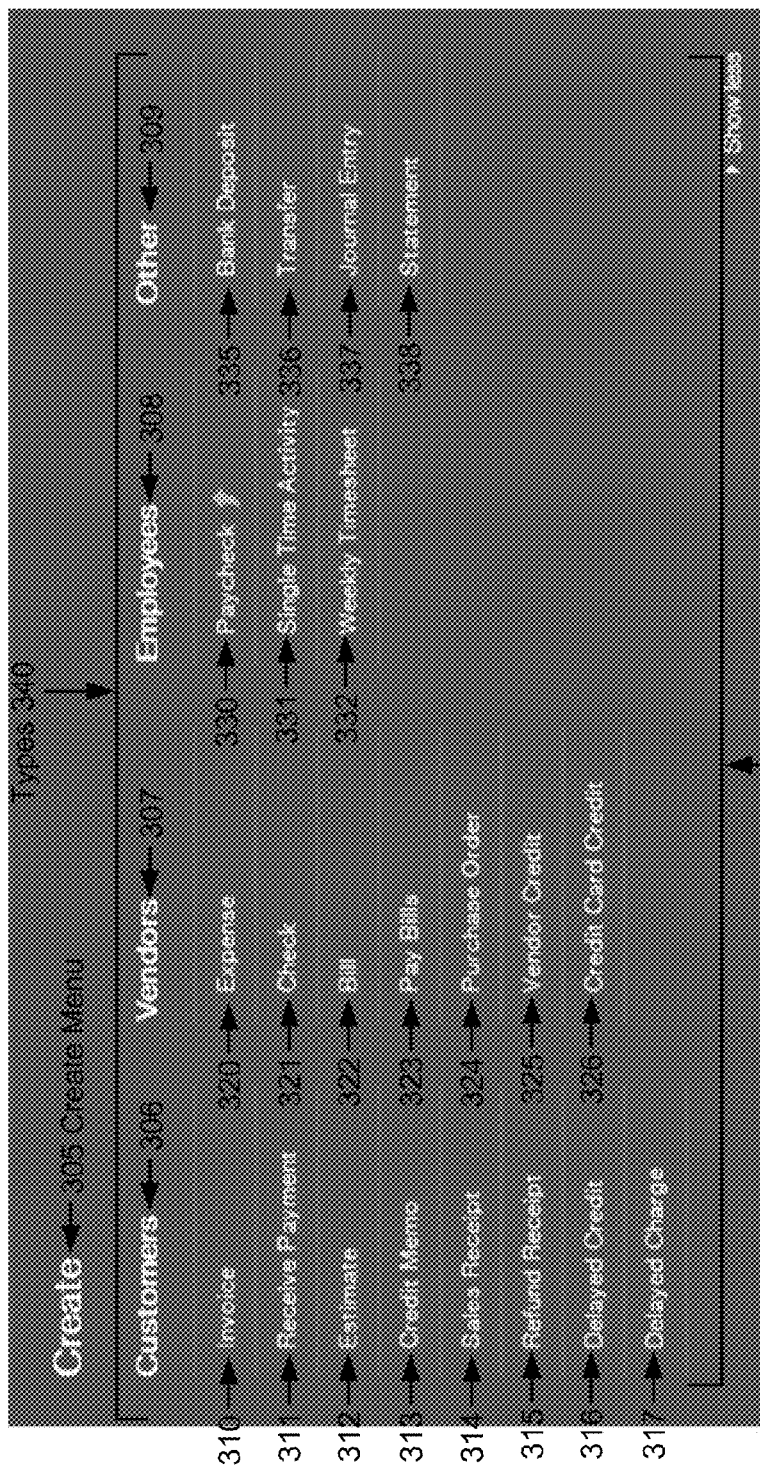
FIGS. 3 and 4 show examples in accordance with one or more embodiments of the invention.

FIG. 3 shows an example in accordance with one or more embodiments of the invention. The example shown in FIG. 3 may be used, for example, with the system (100), to generate a form. The elements shown in FIG. 3 may differ among embodiments of the invention, and one or more of the elements may be optional.

In FIG. 3, a create menu (305) includes various types (340) of entities for form creation, including customers (306), vendors (307), employees (308), and other (309). The customers (306) type may include various form types, including but not limited to invoice (310), receive payment (311), estimate (312), credit memo (313), sales receipt (314), refund receipt (315), delayed credit (316), and delayed charge (317). The vendors (307) type may include various form types, including expense (320), check (321), bill (322), pay bills (323), purchase order (324), vendor credit (325), and credit card credit (326). The employees (308) type may include various form types, including paycheck (330), single time activity (331), and weekly timesheet (332). The other (309) type may also include various form types, such as bank deposit (335), transfer (336), journal entry (337), and statement (338). Those skilled in the art will appreciate that there may be various other types of forms that may be created through the create menu (305) that have not been disclosed.

Figure 4:
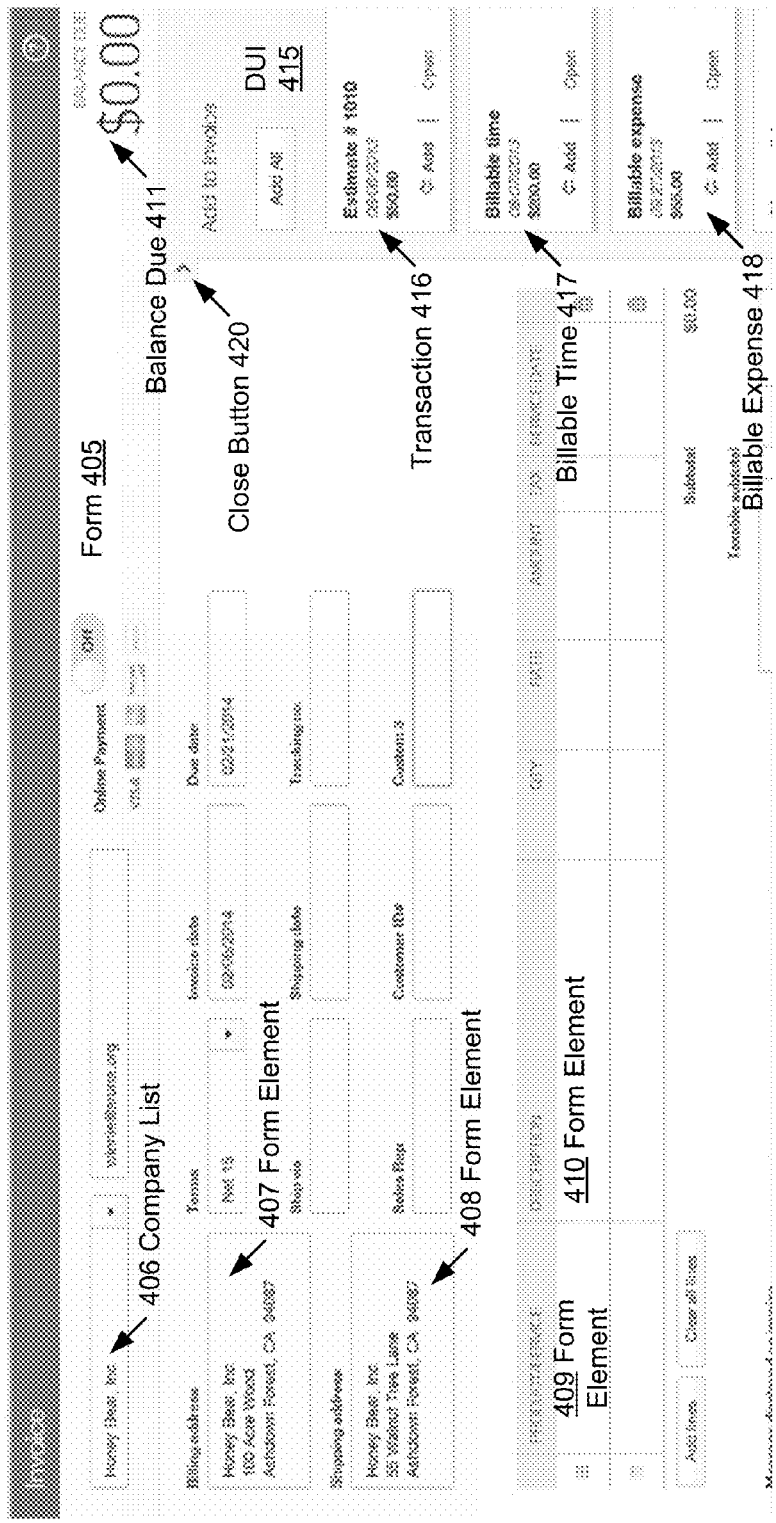

FIG. 4 shows an example in accordance with one or more embodiments of the invention. The example shown in FIG. 4 may be used, for example, with the system (100), to drag and drop a transaction from a DUI to a form. The elements shown in FIG. 4 may differ among embodiments of the invention, and one or more of the elements may be optional.

In FIG. 4, a form (405) for an invoice is shown. The form (405) contains various elements, including a company list (406) containing a list of companies related to the user's business, a form element (407) relating to a billing address of the company, a form element (408) relating to the shipping address of the company, a form element (409) relating to a product and/or service of the invoice, a form element (410) relating to a description of the product and/or service of the invoice, a balance due (411), and other elements such as an email address of the company, an online payment options with various credit cards, terms of the invoice, an invoice date, a due date, shipping details (e.g. carrier, date, tracking number), a sales representative identity, a customer ID number, a quantity, rate, amount, tax, and service date of the product and/or service of the invoice, and a subtotal. Those skilled in the art will appreciate that there may be various other form elements, and that there may be various other form types that are not described.

FIG. 4 also shows a DUI (415) positioned to the right of the form (405). The DUI (415) contains various transactions, such as transaction (416) relating to an estimate for a charge to a customer, a billable time (417) relating to an amount owed by a customer to the user for time spent on a service, and a billable expense (418) relating to an expense incurred on behalf of a customer by the user's business. A close button (420) allows a user to close the DUI (415) and slide it off the invoice form (405). Those skilled in the art will appreciate that the transactions in the DUI (415) may relate to another category beyond a customer, such as a business or an employee, or even the user's business itself. Further, the transactions may be ordered in the DUI (415) according to their names, a monetary amount, a calendar date, and so forth.

Figure 5:
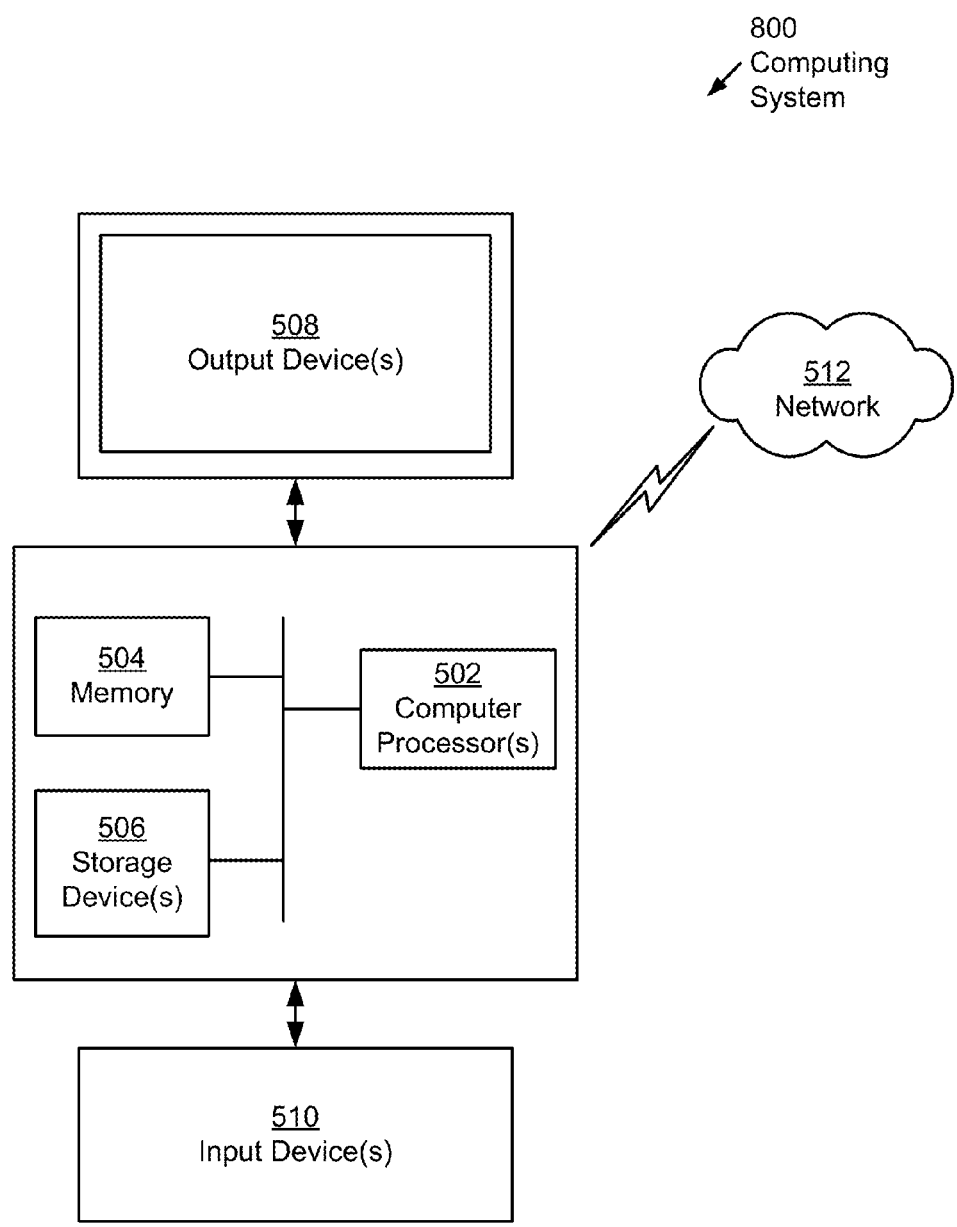
FIG. 5 shows a computer system in accordance with one or more embodiments of the invention.

Embodiments of the invention may be implemented on virtually any type of computing system regardless of the platform being used. For example, the computing system (500) may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (802), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for recording a transaction using a Dynamic User Interface (DUI) within an application, comprising:
   identifying, within the application, a prior transaction relating to a customer of a user;
   obtaining, in response to identifying the prior transaction and by the application, the prior transaction;
   automatically populating, without intervention of the user, the DUI with the prior transaction such that one or more details of the prior transaction are input to the DUI;
   receiving, from the user and within the application, a request to generate a form for the transaction;
   generating, in response to receiving the request to generate the form and within the application, the form comprising a customer list and a form element;
   receiving, from the user and within the application, a request to generate the DUI;
   generating, in response to receiving the request to generate the DUI, the DUI adjacent to the form displayed within the application;
   receiving, from the user and within the form adjacent to the DUI, an identification of the customer from the customer list;
   without intervention of the user and in response to receiving the identification of the customer, displaying within the DUI the prior transaction relating to the customer, wherein the prior transaction is owned by an application operator;
   receiving, from the user, a selection of therp for transaction from the DUI by receiving, from the user, a drag and drop manipulation of a visual representation of the prior transaction from the DUI to the form adjacent to the DUI;
   populating, in response to receiving the selection of the prior transaction and within the form adjacent to the DUI, the form element using therp for transaction;
   in response to populating the form element, temporarily hiding the visual representation of the prior transaction from the DUI; and
   recording, within the application, the transaction.

2. The method of claim 1, further comprising:
   identifying, within the application, a recurring transaction relating to the user;
   obtaining, by the application, the recurring transaction; and
   populating, without intervention of the user, the DUI with the recurring transaction.

3. The method of claim 1, further comprising:
   receiving, from the user and within the application, an expense relating to the user; and
   populating, within the application, the DUI with the expense.

4. The method of claim 1, wherein the transaction relates to a purchase order.

5. The method of claim 1, further comprising:
   receiving, from the user and within the application, a timecard of an employee of the user; and
   populating, within the application, the DUI with the timecard.

6. The method of claim 1, further comprising:
receiving, from the user and within the application, a request to close the DUI; and
closing, based on the request, the DUI by sliding the DUI off the application.

7. The method of claim 1, further comprising:
receiving, from the user, a selection of a company within the form; and
populating, based on the selection, the DUI with a plurality of transactions relating to the company.

8. The method of claim 1, further comprising:
receiving, from the user, a second transaction;
categorizing the transaction and the second transaction to order the transaction and the second transaction; and
populating the DUI with the transaction and the second transaction according to the order.

9. The method of claim 1, further comprising:
receiving, from the user and within the application, an invoice relating to the customer of the user; and
populating, within the application, the DUI with the invoice.

10. The method of claim 1, further comprising:
receiving, from a third party and within the application, a third party transaction;
populating, without intervention from the user, the DUI with the third party transaction.

11. A system for recording a transaction using a Dynamic User Interface (DUI), comprising:
a first service provider server comprising:
a computer processor, and
an application executing on the computer processor, with functionality to perform:
identifying, within the application, a prior transaction relating to a customer of a user,
obtaining, in response to identifying the prior transaction, the prior transaction,
automatically populating, without intervention of the user, the DUI with the prior transaction such that one or more details of the prior transaction are input to the DUI,
receiving, from the user and within the application, a request to generate a form for the transaction,
generating, in response to receiving the request to generate the form and within the application, the form comprising a customer list and a form element,
receiving, from the user and within the application, a request to generate the DUI,
generating, in response to receiving the request to generate the DUI, the DUI adjacent to the form displayed within the application,
receiving, from the user and within the form adjacent to the DUI, an identification of the customer from the customer list,
without intervention of the user and in response to receiving the identification of the customer, displaying within the DUI the prior transaction relating to the customer, wherein the prior transaction is owned by an application operator,
receiving, from the user, a selection of the prior transaction from the DUI by receiving, from the user, a drag and drop manipulation of a visual representation of the prior transaction from the DUI to the form adjacent to the DUI,
populating, in response to receiving the selection of therp for transaction and within the form adjacent to the DUI, the form element using the prior transaction,
in response to populating the form element, temporarily hiding the visual representation of the prior transaction from the DUI, and
recording, within the application, the transaction; and
a second service provider server communicatively coupled to the first service provider server and comprising a data repository storing the transaction.

12. The system of claim 11, wherein the application comprises further functionality to perform:
identifying, within the application, a recurring transaction relating to the user;
obtaining, by the application, the recurring transaction; and
populating, without intervention of the user, the DUI with the recurring transaction.

13. The system of claim 11, wherein the application comprises further functionality to perform:
receiving, from the user and within the application, an expense relating to the user; and
populating, within the application, the DUI with the expense.

14. The system of claim 11, wherein the application comprises further functionality to perform:
receiving, from the user and within the application, a timecard of an employee of the user; and
populating, within the application, the DUI with the timecard.

15. The system of claim 11, wherein the application comprises further functionality to perform:
receiving, from the user and within the application, a request to close the DUI; and
closing, based on the request, the DUI by sliding the dynamic UI off the application.

16. The system of claim 11, wherein the application comprises further functionality to perform:
receiving, from the user, a selection of a company within the form; and
populating, based on the selection, the DUI with a plurality of transactions relating to the company.

17. The system of claim 11, wherein the application comprises further functionality to perform:
receiving, from the user, a second transaction;
categorizing the transaction and the second transaction to order the transaction and the second transaction; and
populating the DUI with the transaction and the second transaction according to the order.

18. The system of claim 11, wherein the application comprises further functionality to perform:
receiving, from the user and within the application, an invoice relating to the customer of the user; and
populating, within the application, the DUI with the invoice.

19. The system of claim 11, wherein the application comprises further functionality to perform:
receiving, from a third party and within the application, a third party transaction;
populating, without intervention from the user, the DUI with the third party transaction.

20. A non-transitory computer readable storage medium storing instructions for recording a transaction using a Dynamic User Interface (DUI) within an application, the instructions executable on a computer processor and comprising functionality for:

identifying, within the application, a prior transaction relating to a customer of a user;

obtaining, in response to identifying the prior transaction and by the application, the prior transaction;

automatically populating, without intervention of the user, the DUI with the prior transaction such that one or more details of the prior transaction are input to the DUI;

receiving, from the user and within the application, a request to generate a form for the transaction;

generating, in response to receiving the request to generate the form and within the application, the form comprising a customer list and a form element;

receiving, from the user and within the application, a request to generate the DUI;

generating, in response to receiving the request to generate the DUI, the DUI adjacent to the form displayed within the application;

receiving, from the user and within the form adjacent to the DUI, an identification of the customer from the customer list;

without intervention of the user and in response to receiving the identification of the customer, displaying within the DUI the prior transaction relating to the customer, wherein the prior transaction is owned by an application operator;

receiving, from the user, a selection of the prior transaction from the DUI by receiving, from the user, a drag and drop manipulation of a visual representation of the prior transaction from the DUI to the form adjacent to the DUI;

populating, in response to receiving the selection of the prior transaction and within the form adjacent to the DUI, the form element using the prior transaction;

in response to populating the form element, temporarily hiding the visual representation of the prior transaction from the DUI; and recording, within the application, the transaction.

21. The non-transitory computer readable storage medium of claim 20, the instructions further comprising functionality for:

identifying, within the application, a recurring transaction relating to the user;

obtaining, by the application, the recurring transaction; and populating, without intervention of the user, the DUI with the recurring transaction.

22. The non-transitory computer readable storage medium of claim 20, the instructions further comprising functionality for:

receiving, from the user and within the application, an expense relating to the user; and populating, within the application, the DUI with the expense.

23. The non-transitory computer readable storage medium of claim 20, the instructions further comprising functionality for:

receiving, from the user and within the application, a timecard of an employee of the user; and populating, within the application, the DUI with the timecard.

24. The non-transitory computer readable storage medium of claim 20, the instructions further comprising functionality for:

receiving, from the user and within the application, a request to close the DUI; and closing, based on the request, the DUI by sliding the DUI off the application.

25. The non-transitory computer readable storage medium of claim 20, the instructions further comprising functionality for:

receiving, from the user, a selection of a company within the form; and populating, based on the selection, the DUI with a plurality of transactions relating to the company.

\* \* \* \* \*